United States Patent [19]
Prenat

[11] Patent Number: 4,746,922
[45] Date of Patent: May 24, 1988

[54] METHOD OF AND DEVICE FOR REMOVING RANGE AMBIGUITY IN A PULSE-DOPPLER RADAR AND RADAR INCLUDING SUCH A DEVICE

[75] Inventor: Michel Prenat, Paris, France

[73] Assignee: Thomson- CSF, Paris, France

[21] Appl. No.: 377,451

[22] Filed: May 6, 1982

[30] Foreign Application Priority Data

May 15, 1981 [FR] France ............................ 81 09759

[51] Int. Cl.$^4$ .................................. G01S 13/12
[52] U.S. Cl. ..................................... 342/88; 342/109; 342/137
[58] Field of Search ............... 343/7.5, 9 R, 17.1 PF; 342/88, 109, 137

[56] References Cited

U.S. PATENT DOCUMENTS 3,935,572  1/1976  Broniwitz et al. .................. 343/9
4,064,510 12/1977  Chabah ............................... 342/88
4,106,019  8/1978  Alexander et al. ............. 342/137 X
4,143,373  3/1979  Chernick ..................... 343/17.1 PF Primary Examiner—T. H. Tubbesing
Attorney, Agent, or Firm—Karl F. Ross; Herbert Dubno

[57] ABSTRACT

This invention relates to a method of and a device for removing range ambiguity in a pulse Doppler radar and to a radar including such a device especially for missile guidance. On tracking operation at a high pulse repetition frequency the method consists in switching the repetition frequency $f_R(k)$ for each time interval $\Delta t$, over a new value $f_R(k+1)$ obtained in a circuit from the measured ambiguous range $y(k)$ and from the ambiguity number $\hat{n}(k)$, as estimated in a circuit from radar information supplied by the radar, in order to remove eclipsing, to maintain the ambiguity number constant and to estimate the range with a growing accuracy in the course of the tracking operation.

2 Claims, 2 Drawing Sheets

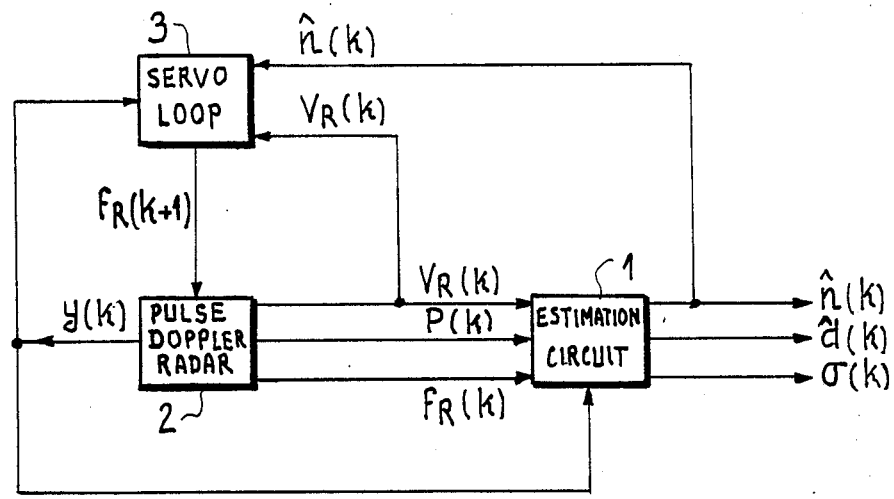
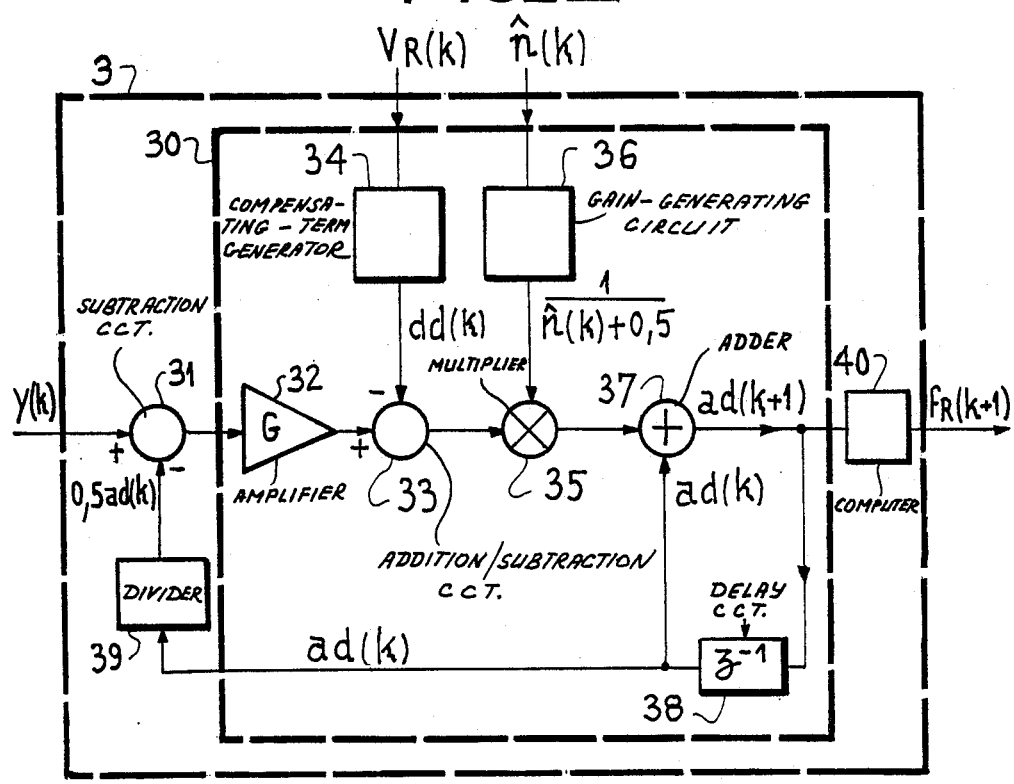

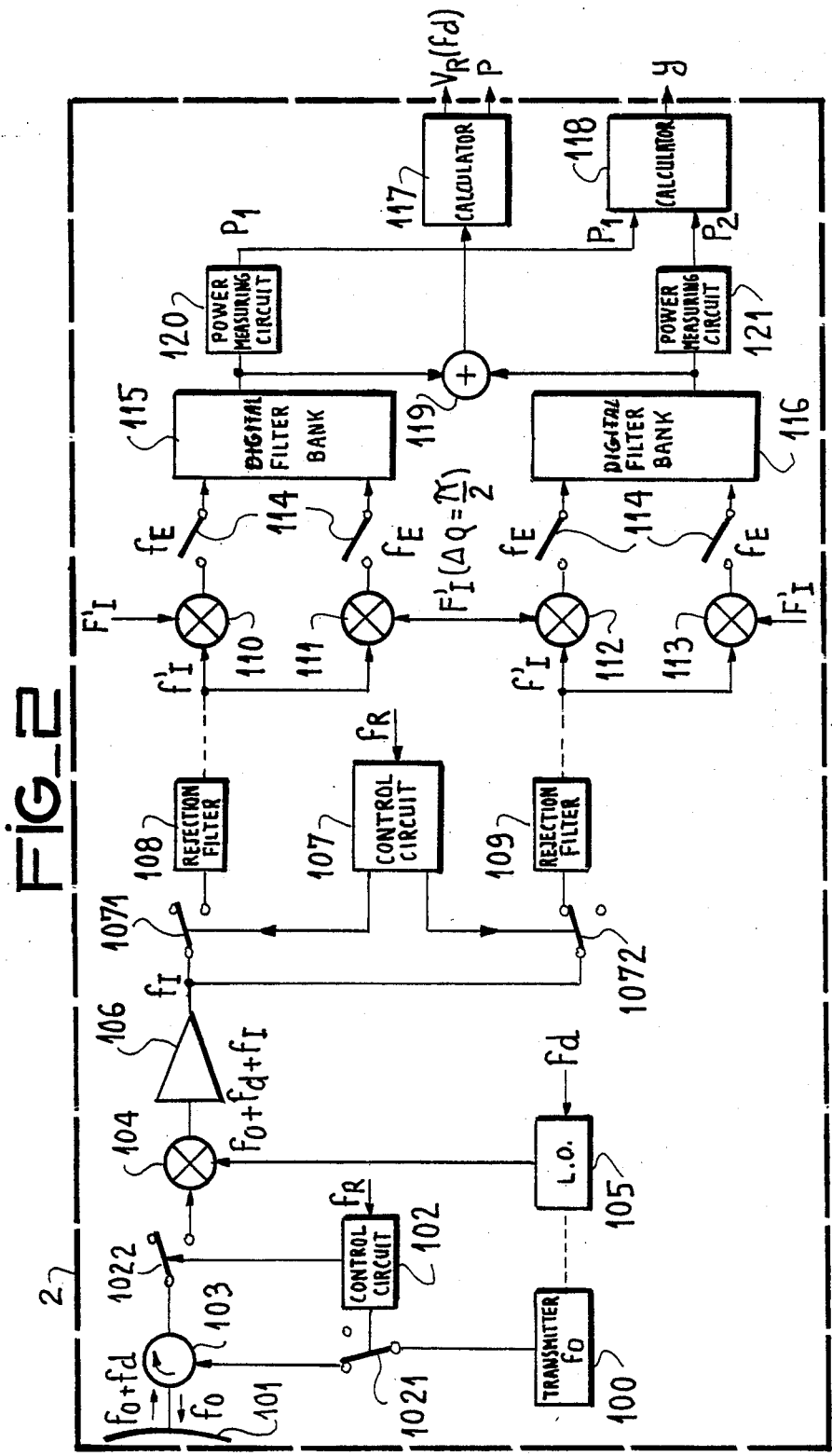
Fig_2

4,746,922

METHOD OF AND DEVICE FOR REMOVING RANGE AMBIGUITY IN A PULSE-DOPPLER RADAR AND RADAR INCLUDING SUCH A DEVICE

FIELD OF THE INVENTION

This invention relates to a method of and a device for removing range ambiguity in a pulse-Doppler radar having a high pulse repetition frequency and to a radar including such a device.

BACKGROUND OF THE INVENTION

In a Doppler radar transmitting pulses with a repetition frequency $f_R$, the transmitted signal spectrum consists of a line at the carrier frequency and side lines located on either side of the carrier frequency at intervals equal to the repetition frequency. The received signal undergoes relative to the transmitted signal a delay equal to the time taken by the latter to cover the distance from the radar to the target and back to the radar plus a frequency shift due to the Doppler effect.

The same antenna is used for transmission and reception. The receiver is gated off during the transmission time. There will therefore be an eclipsing phenomenon, i.e. targets received at this time are blanked or "eclipsed". This phenomenon is the more bothersome as the form factor approaches 0.5.

The pulse-Doppler radars whose repetition frequency is high do not involve any velocity ambiguity but rather a range ambiguity due to the fact that one knows the signal delay received relative to the transmitted signal only with a modulus equal to the repetition period. This ambiguity over range can be removed through an adequate change in the repetition frequency.

A known method of measuring range on tracking operation consists in periodically modulating the radar transmission frequency. The spectrum of the received signal then consists of the main line and of side lines at the harmonics of the modulation frequency. The anplitude of such lines gives a measurement of the target range.

In this type of measurement, the width of the filters used for the various lines of the signal is constant. When the signal—to—noise ratio is constant, the accuracy of the measurement is also constant. However, a low signal—to—noise ratio does not allow accurate measurements.

OBJECTS OF THE INVENTION

It is an object of the present invention to estimate with a growing accuracy as tracking proceeds, the unambiguous range of a target to a high repetition frequency radar from all the measurements of the ambiguous range effected from the beginning of the tracking operation.

It is another object of this invention to estimate the unambiguous range from target to a high PRF radar with a high accuracy, even in the case of a very low signal—to—noise ratio.

It is another object of this invention to minimize the eclipsing loss by varying appropriately the repetition frequency.

It is another object of this invention to manage the repetition frequency of the signal transmitted by the radar according to the ambiguous range measured and the unambiguous range estimated so as to maintain the ambiguous number constant at least during the time required for ahcieving a sufficiently good range estimation.

It is another object of this invention to minimize the risk of tracking failure due to eclipsing.

SUMMARY OF THE INVENTION

According to the present invention the method of removing range ambiguity in a pulse Doppler tracking radar, the repetition frequency of which is high and variable and which includes a circuit providing the ambiguous range measurements at times $T_k=k\Delta t$, where $\Delta t$ is the time interval required by the radar to supply radar information, comprises the following steps for a measurement cycle at a repetition frequency $f_R(k)$:

measuring the ambiguous range at time $T_k$;

estimating the ambiguity number, the unambiguous radar-to-target range, and the standard deviation $\sigma_d(k)$ of the error in the estimated unambiguous range;

calculating from the measured ambiguous range and from the estimated ambiguity number a new repetition frequency $f_R(k+1)$ which is such that, at the following measurement cycle at the new repetition frequency $f_R(k+1)$, the ambiguity number remains constant, and the standard deviation $\sigma_d(k+1)$ of the error in the unambiguous radar to-target range is lower than that $\sigma_d(k)$ of the previous cycle at the former repetition frequency $f_R(k)$.

BRIEF DESCRIPTION OF THE DRAWING

The specific nature of the invention as well as other objects, aspects, uses and advantages thereof will clearly appear from the following description and from the accompanying drawing in which:

FIG. 1 is a block diagram of a device using the method according to the invention;

FIG. 2 is a block diagram of a pulse-Doppler radar comprised in the device of FIG. 1; and FIG. 3 shows a servo-loop for controlling the repetition frequency.

SPECIFIC DESCRIPTION

A high PRF pulse Doppler radar has range ambiguities. If the form factor (duty cycle) approaches 0.5, eclipsing occurs which lowers the signal—to—noise ratio and may cause a falling out of tracking (i.e. blanking). In order to prevent eclipsing a well-known process consists in changing the repetition frequency before eclipsing occurs.

The problems to be solved are therefore the following:

It is desired to control the repetition frequency $f_R$ so as to maintain the ambiguity number constant for removing the range ambiguity and minimizing eclipsing loss.

It is desired to estimate at a very high accuracy the unambiguous radar-to-target range from the measurement of the ambiguous range.

The repetition frequency will be controlled from the measured ambiguous range and from the estimated ambiguity number.

It is remembered that the ambiguity number is such an integer that its product by the maximum ambiguity range plus the ambiguous range is equal to the radar-target range.

In the subsequent description, $\Delta t$ denotes the period or time lapse for obtaining the data processed by the radar. Usually, this period is equal to the coherent filtering time. The data or measurements at the moment $T_k = k \cdot \Delta t$ are denoted by the following symbols, with a repetition frequency $f_R(k)$:

ad(k) is the maximum ambiguity range. It depends on the repetition frequency $f_R(k)$ of the transmitted pulses according to the relationship $$ad(k) = c/2f_R(k) \tag{I}$$

where c is the speed of the light da(k) is the ambiguous range.
da(k) is between 0 and ad(k).
d(k) is the unambiguous radar-to-target range
y(k) is the measured ambiguous range.
$\sigma^2(k)$ is the variance of the error in the normalized ambiguous range defined as da(k)/ad(k). It is assumed to be known or at least estimated.
$\epsilon(k)$ is the error in the measurement y(k) of the ambiguous range da(k).
Hence $$y(k) = da(k) + \epsilon(k) \tag{II}$$

This error is assumed to be a gaussian distribution with a mean zero and a variance $\sigma^2(k)ad^2(k)$ n(k) ambiguity number is such an integer that:

$$d(k) = n(k)ad(k) + da(k) \tag{III}$$

$\tilde{d}(k)$ is the estimation of the range d(k) from the radar to the target prior to the measurement y(k).
$\hat{d}(k)$ is the estimation of the range d(k) after the measurement y(k).
$\tilde{n}(k)$ is the estimation of the ambiguity number n(k) prior to the measurement y(k).
$\hat{n}(k)$ in the estimation of the ambiguity number n(k) after measurement y(k).
$\sigma_d(k)$ is the standard deviation of the error in the range d(k).
dd(k) is the distance covered between the moments $T_k$ and $T_{k+1}$:

$$d(k+1) = d(k) - dd(k) \tag{IV}$$

The precision which can be reached by the device according to the invention can be a priori appreciated through an estimation of the standard-deviation value $\sigma_d$ of the error in the radar-to-target range d after a measuring time T, by means of the following relationship:

$$\sigma_d = \frac{\sigma \cdot \sqrt{3} \cdot c \cdot do}{\left(\frac{T}{\Delta t}\right)^{1,5} V_R \cdot \Delta t \cdot f_{Ro}}$$

where
do is the radar-to-target range at the beginning of the measurement.
$f_{Ro}$ is the value of the repetition frequency $f_R$ at the beginning of the measurement.
$\sigma$ is the standard-deviation of the error in the normalized ambiguous range da(k)/ad(k).
If the signal/noise ratio is constant and known, $\sigma$ will be constant.
If this ratio S/N is not known but has only been estimated, the real standard deviation $\sigma d$ will be slightly higher than the value obtained through the hereabove formula.

The above formula makes it possible to a priori compute the standard-deviation $\sigma_d$ when:
the variation of the range during the observation time is small compared with the range itself.
the velocity with which the radar draws nearer to the target is constant and equal to $V_R$.
Nothing is a priori known about the radar-to-target range.

Such requirements are not essential for a satisfactory operation of the device according to the invention and are only necessary for an a priori knowledge of the standard deviation $\sigma d$.

FIG. 1 shows the block diagram of the device for removing range ambiguity according to the invention.

In order that this device can operate, the radar has to be in the tracking mode. Indeed in that case, the Doppler filter is narrow enough to make the signal/noise ratio sufficient.

Reference 1 denotes a device for filtering linearly the values y(k) of the measured ambiguous range, so as to deduce therefrom the estimated value $\hat{d}(k)$ of the radar-to-target range, the estimated value $\hat{n}(k)$ of the ambiguity number as well as the value $\sigma_d(k)$ of the standard deviation of the error in the value of the radar-to-target range d(k).

The device 1 described in this embodiment is a Kalman filter. The filtering carried out by this device 1 is a linear combination of all the measured values y(k) of the ambiguous range from the beginning of the tracking. The estimated values $\hat{d}(k)$ of the unambiguous radar-to-target range and $\hat{n}(k)$ of the ambiguity number are obtained through recurrence formulae. With this difference with a conventional linear filtration corresponding with a transfer function that the recurrence relationships have non constant coefficients. This Kalman filter 1 is not an object of the present invention and is not described. Similarly, the recurrence formulae used for the estimations $\hat{d}(k)$ and $\hat{n}(k)$ are not proved. Only the known results are given. They are only applied to the specific case of a device for removing range ambiguity according to this invention.

For its operation the filter 1 or estimation circuit requires some data from the pulse Doppler radar, namely:

the radial velocity $V_R(k)$ of the target relative to the radar. It is also the derivative of the radar-to-target range. It is known from the Doppler frequency of the target at the moment $T_k$. The number of the Doppler filter indicates the relative velocity of the target with an accuracy high enough to ensure a very good compensation for the variations of the range whose value is to be estimated; hence as to the Kalman filter 1, the radar-to-target range can be regarded as constant.

the repetition frequency $f_R(k)$ as used by the radar to do all the required measurements at time $T_k$. This frequency $f_R(k)$ is known and regarded as constant at least during the time interval $\Delta t$ between the moments $T_k$ and $T_{k+1}$.

the total power P(k) of the signal (Useful Signal + Thermal Noise) in the final filter of the radar. This power is a good estimation of the signal/noise ratio, and will be used for weighting the measured values y(k) of the ambiguous range.

the value y(k) of the ambiguous range as measured at time $T_k$.

These values $V_R(k)$, $f_R(k)$, $P(k)$, $y(k)$ will be supplied by the pulse Doppler radar 2. It should be provided with a device for measuring the ambiguous range and with a computer having access to some data and enabling inter alia the repetition frequency $f_R(k)$ of the transmitted pulses to be controlled. The Kalman filter 1 is a part of a the computer with which the radar 2 is supplied.

The repetition frequency $f_R(k)$ of pulses transmitted by the radar 2 can be modified by means of a servo-loop 3. This loop 3 filters data $y(k)$, representing the the ambiguous range as measured by radar 2, so as to deduce from the maximum ambiguity range $ad(k)$, i.e. from the repetition period $1/f_R(k)$ at time $T_k$, the value $ad(k+1)$ of the maximum ambiguity range at time $T_{K+1} = T_k + \Delta t$, and consequently the new value of the repetition frequency $f_R(k+1)$ to which it is linked through the following relationship:

$$f_R(k+1) = c/2ad(k+1) \qquad \text{(I bis)}$$

where c is the light velocity.

The ambiguity number $n(k)$ as well as the the distance covered during the time lapse $\Delta t$ are taken into account. These data are supplied by the Kalman filter 1 and radar 2 respectively in the form of the relative radial velocity of the target.

As regards the Kalman filter 1, the process can be described as follows, on a matrix form, by means of a state matrix equation of a measurement matrix equation.

The state equations are the following ones $$d(k+1) = d(k) - dd(k) \qquad \text{(IV)}$$

and $$n(k+1) = n(k) \qquad \text{(X)}$$

For a satisfactory operation of the device according to the invention the ambiguity number is assumed to remain constant equal to n. In the practical case before the repetition frequency $f_R(k)$ reaches too high values, the range estimator shall have become sufficiently good for one to know by how many digits the ambiguity number has varied, as one goes back, ensuring a low value for $f_R(k)$.

Let $X(k)$ be the matrix $$\begin{bmatrix} d(k) \\ n(k) \end{bmatrix}$$

In a matrix form, we have:

$$\begin{bmatrix} d(k+1) \\ n(k+1) \end{bmatrix} = \begin{bmatrix} 1 & 0 \\ 0 & 1 \end{bmatrix} \begin{bmatrix} d(k) \\ n(k) \end{bmatrix} + \begin{bmatrix} -dd(k) \\ 0 \end{bmatrix}$$

The state matrix equation therefore consists of the following relationship (XI):

$$X(k+1) = AX(k) + V(k) \qquad \text{(XI)}$$

With A the identity matrix $$\begin{bmatrix} 1 & 0 \\ 0 & 1 \end{bmatrix}$$

of the second order and $$V(k) = \begin{bmatrix} -dd(k) \\ 0 \end{bmatrix}$$

The measurement equations consist of the two following relationships:

$$y(k) = da(k) + \epsilon(k) \qquad \text{(II)}$$

$$d(k) = n(k)ad(k) + da(k) \qquad \text{(III)}$$

Through a combination of the relationships (II) and (III) the following relationships will be obtained:

$$y(k) = d(k) - n(k)ad(k) + \epsilon(k) \qquad \text{(XII bis)}$$

The measurement matrix equation consists of the following relationship (XII):

$$Y(k) = [1 - ad(k)] \begin{bmatrix} d(k) \\ n(k) \end{bmatrix} + \epsilon(k)$$

let $$Y(k) = C(k).X(k) + \epsilon(k) \qquad \text{(XII)}$$

$\epsilon(k)$ is a scalar representing the error in the measurement $y(k)$ represented by the scalar matrix $Y(k)$ where $C(k) = [1 - ad(k)]$; the variance of $\epsilon(k)$ is $\sigma^2(k)ad^2(k)$ where $\sigma(k)$ is the error standard-deviation of the error in the normalized ambiguous range $$\frac{da(k)}{da(k)}$$

In this Kalman filter, the discrete solutions $\hat{X}(k)$ of the equations are given by:

$$\hat{X}(k) = \tilde{X}(k) + K(k)[Y(k) - C(k)\tilde{X}(k)] \qquad \text{(XIII)}$$

with $$\tilde{X}(k) = A(k-1)\hat{X}(k-1) + V(k-1) \qquad \text{(XIII-1)}$$

$$A(k) = \begin{bmatrix} 1 & 0 \\ 0 & 1 \end{bmatrix} \qquad \text{(XIII-2)}$$

$$V(k) = \begin{bmatrix} -dd(k) \\ 0 \end{bmatrix} \qquad \text{(XIII-3)}$$

In this solution we have:

$$K(k) = \Sigma(k)C^T(k)W^{-1}(k) \qquad \text{(XIV-1)}$$

$$W(k) = \text{variance of } \epsilon(k) = \sigma^2(k)ad^2(k) \qquad \text{(XIV-2)}$$

$$C(k) = [1 - ad(k)] \qquad \text{(XIV-3)}$$

$$\Sigma(k) = \lambda(k) - \lambda(k)C^T(k)[C(k).\lambda(k)C^T(k) + W(k)]^{-1}C(k)\lambda(k) \qquad \text{(XIV-4)}$$

$$\lambda(k+1) = A(k)\Sigma(k)A^T(k)$$

with $$\lambda(k) = \begin{bmatrix} \lambda 11(k) & \lambda 12(k) \\ \lambda 12(k) & \lambda 22(k) \end{bmatrix} \text{ the variance matrix of } \hat{X}(k)$$

Symbols "T" and "−1" denote the transposed and inverse matrices respectively of the marked matrix.

The solutions of the equation (XIII) are the following ones:

$$\hat{X}(k+1) = \begin{bmatrix} \hat{d}(k+1) \\ \hat{n}(k+1) \end{bmatrix}$$

which can be expressed by the two following equations:

$$\hat{d}(k+1) = \overline{d}(k+1) + \Delta(k+1)\frac{\lambda 11(k+1) - \lambda 12(k+1)ad(k+1)}{\sigma^2(k+1)\,ad^2(k+1)}$$

$$\hat{n}(k+1) = \overline{n}(k+1) + \Delta(k+1)\frac{\lambda 12(k+1) - \lambda 22(k+1)ad(k+1)}{\sigma^2(k+1)\,ad^2(k+1)}$$

with $\Delta(k+1) = y(k+1) - \overline{d}(k+1) + \overline{n}(k+1)ad(k+1)$ $$\overline{d}(k+1) = \hat{d}(k) - dd(k)$$

$$\overline{n}(k+1) = \hat{n}(k)$$

$$\lambda 11(k+1) = \lambda 11(k) - \frac{1}{\alpha(k+1)}[\lambda 11(k) - ad(k+1)\lambda 12(k)]^2$$

$$\lambda 12(k+1) = \lambda 12(k) - \frac{1}{\alpha(k+1)}[\lambda 11(k) - ad(k+1)\lambda 12(k)] \cdot [\lambda 12(k) - ad(k+1)\lambda 22(k)]$$

$$\lambda 22(k+1) = \lambda 22(k) - \frac{1}{\alpha(k+1)}[\lambda 22(k) - ad(k+1)\lambda 22(k)]^2$$

$$\alpha(k+1) = \lambda 11(k) - 2ad(k+1)\lambda 12(k) + ad^2(k+1)\lambda 22(k) + \sigma^2(k+1)$$

At time $T_K$, the estimated radar-to-target range is $\hat{d}(k)$ and the standard-deviation on this measurement is $$\sigma_d(k) = \sqrt{\lambda 11(k)}.$$

The Kalman filter 1 can be initialized in two different ways:

If a sufficient number of statistical data about range at the time when tracking begins (acquisition range) is available, the initial values can be a priori set:
$\hat{d}(1), \hat{n}(1)$,
$\lambda 11(1) = $ variance of $\hat{d}(1)$,
$\lambda 22(1) = $ variance of $\hat{n}(1)$ and
$\lambda 12(1) = $ covariance of $\hat{n}(1)$ and $\hat{d}(1)$.

If no datum is a priori known about range, one has to wait for the first two measurements $y(0)$ and $y(1)$ of the ambiguous range at times $T_0 = 0$ and $T_1 = \Delta t$.

The formulae used for the intializing filter 1 are therefore obtained as follows:

From the relationship (II), we have:

$$y(0) = da(0) + \epsilon(0)$$

$$y(1) = da(1) + \epsilon(1)$$

From the relationship (III), the range $d(k)$ at time $T_k = k\Delta t$ is equal to $$d(k) = n(k)ad(k) + da(k) = nad(k) + da(k)$$

as $n(k)$ is constant and equal to n.
Therefore:

$$d(0) = nad(0) + y(0) - \epsilon(0) \quad \text{(III-0)}$$

$$d(1) = nad(1) + y(1) - \epsilon(1) = d(0) - dd(0) \quad \text{(III-1)}$$

from the relationship (IV).

From the two previous equations (III-0) and (III-1):

$$d(1) = \frac{[y(0) - \epsilon(0) - dd(0)]ad(1) - [y(1) - \epsilon(1)]ad(0)}{ad(1) - ad(0)} \quad \text{(V bis)}$$

That leads us to choose $d(1)$ is the estimated value of $\hat{d}(1)$ at time $T_1$ after measurement $y(1)$ of the ambiguous range:

$$d(1) = \frac{[y(0) - dd(0)]ad(1) - y(1)ad(0)}{ad(1) - ad(0)}. \quad \text{(V)}$$

$ad(0)$ and $ad(1)$ are known as the repetition frequency is known at times $T_0$ and $T_1 = T_0 + \Delta t$ and makes it possible to measure the ambiguous range $y(0)$ and $y(1)$. The distance $dd(0)$ covered between times $T_0$ and $T_1$ is also known with accuracy by measuring the Doppler frequency of the received signal. The error in $dd(0)$ is assumed to be negligible.

From the relationships (V) and (V bis), the error $\delta(1)$ in this estimator of the range at time $T_1$ is given by the following equation:

$$\delta(1) = \hat{d}(1) - d(1) = \frac{\epsilon(0)ad(1) - \epsilon(1)ad(0)}{ad(1) - ad(0)} \quad \text{(VI bis)}$$

The mean of this error is 0. Its square is equal to $$[\delta(1)]^2 = \left[\frac{\epsilon(0)ad(1)}{ad(1) - ad(0)}\right]^2 + \left[\frac{\epsilon(1)ad(0)}{ad(1) - ad(0)}\right]^2 - \frac{2\epsilon(0)\epsilon(1)ad(0)ad(1)}{ad(1) - ad(0)^2}$$

As already mentioned, $\epsilon(k)$ is a supposedly gaussian error having a mean and a variance respectively equal to zero and $\sigma^2(k)\,ad^2(k)$. After the numerator and the denominator of the second member of the previous equality have been divided by $ad^2(1)\,ad^2(0)$, the variance of $\hat{d}(1)$ is given by the subsequent relationship (VI), as $\epsilon(0)$ and $\epsilon(1)$ are independent errors.

$$V[\hat{d}(1)] = \frac{\sigma^2(0) + \sigma^2(1)}{\left[\frac{1}{ad(0)} - \frac{1}{ad(1)}\right]^2} = \sigma_d(1)^2 \quad \text{(VI)}$$

From the previously given relationships (III-0) and (III-1), the ambiguity number $\hat{n}(1)$ is equal to:

$$n(1) = \frac{y(0) - \epsilon(0) - dd(0) - [y(1) - \epsilon(1)]}{ad(1) - ad(0)} \quad \text{(VI)}$$

This equation lead us to choose, if $\hat{n}(1)$ is the estimated value of n(1) at time $T_1$ after the measurement y(1) of the ambiguous range $$\hat{n}(1) = \frac{y(0) - dd(0) - y(1)}{ad(1) - ad(0)} \quad \text{(VII)}$$

An error in this estimated value of n(1) is equal to:

$$\hat{n}(1) - n(1) = \frac{\epsilon(0) - \epsilon(1)}{ad(1) - ad(0)} \quad \text{(VII bis)}$$

If one does not resort to the fact that n is an integer, the error in n(1) is gaussian and has a null mean. Its square is equal to:

$$[\hat{n}(1) - n(1)]^2 = \frac{\epsilon^2(0) + \epsilon^2(1) - 2\epsilon(0)\epsilon(1)}{[ad(1) - ad(0)]^2}$$

$\epsilon(0)$ and $\epsilon(1)$ are independent errors, therefore the variance of $\hat{n}(1)$ is given by the following relationship (VIII) after the numerator and the denominator have been divided by $ad^2(1).ad^2(0)$.

$$V[\hat{n}(1)] = \frac{\frac{\sigma^2(0)}{ad^2(1)} + \frac{\sigma^2(0)}{ad^2(0)}}{\left[\frac{1}{ad(0)} - \frac{1}{ad(1)}\right]^2} \quad \text{(VIII)}$$

From the relationships (VI bis) and (VII bis) the covariance of these two estimated value $\hat{d}(1)$ and $\hat{n}(1)$ are equal to the following relationship (IX) by dividing the numerator and the denominator by $ad^2(1).ad^2(0)$:

$$\text{Cov}(1) = \frac{\frac{\sigma^2(0)}{ad(1)} + \frac{\sigma^2(1)}{ad(0)}}{\left[\frac{1}{ad(0)} - \frac{1}{ad(1)}\right]^2} \quad \text{(IX)}$$

If no datum is available about range, the relationships V, VII, VI, VIII, IX for the respective values of $\hat{d}(1)$, $\hat{n}(1)$, $\lambda 11(1)$, $\lambda 22(1)$, $\lambda 12(1)$ are therefore used for initializing the Kalman filter 1.

In a pulse Doppler radar having a high repetition frequency and a small form factor, the ambiguous range can be known from the number of the range-gate. But when the form factor nears 0.5, the ambiguous range can be obtained in a known way by measuring the power of the signal received in two range-gates having the same width equal to half the width of the received pulse and split in it. This is illustrated by FIG. 2 representing a pulse Doppler radar provided with a device for measuring the ambiguous range.

In the radar whose block diagram is shown by FIG. 2, the transmitter 100 transmits a microwave signal of carrier frequency $f_o$.

This signal is split into pulses through a switch 1021 controlled by the control circuit 102. The repetition frequency is $f_R(k)$ and the form factor about 0.5. A circulator 103 directs the generated signal towards antenna 101 which radiates towards the detected target, as the radar operates in the tracking mode. The signal sent back by the target is received by the same antenna at a carrier frequency $f_o+f_d$, where $f_d$ is the Doppler frequency and goes through the circulator 103. A switch 1022 controlled by the same control circuit 102 as for switch 1021 but in phase opposition applies the received signal at the input of a mixer 104 when the switch 1021 is on, i.e. when there is no transmission, and inversely, switch 1022 is on while the transmission is on. The switching frequency of the two switches 1021 and 1022 is therefore equal to the repetition frequency $f_R(k)$, with a form factor of 0.5.

A local oscillator 105, coherent with transmitter 100, delivers a signal of frequency $f_o+f_d-f_I$, where $f_I$ is an intermediate frequency and $f_d$ the Doppler frequency obtained through a servo-loop (not represented) at the output of the Doppler filter of the receiver as the radar is assumed to operate in a tracking mode. This signal is applied to the second input of the mixer 104, which delivers a signal at the intermediate frequency $f_I$ to a preamplifier 106.

The output signal of the preamplifier 106 will then be applied to the input of first and second receivers respectively which are composed of similar circuits, namely in series:

A switch 1071, 1072 respectively, operating in phase opposition and controlled by the control circuit 107 at a switching frequency $f_R(k)$ but with a form factor of 0.25. These switches 1071 and 1072 make it possible to split two gates in the received signal, after it has been transposed at the intermediate frequency. These two gates have a width which is equal to half the width of the transmitted pulses. The trailing edge of the first gate and the leading edge of the second gate coincide with the middle of the received pulse: The first and second receivers work respectively on the first and second split gates.

an analog rejection filter 108, respectively 109, which is centered on the intermediate frequency and whose pass-band is a few kHz wide. Its sharp flanks make it possible to reject the high level interfering signal.

this filter is generally followed by a transposition to a second intermediate frequency $f'_I$, and by an amplification with a automatic gain control (not represented).

the signal at the intermediate frequency $f'_I$ is then applied to the input of two mixers 110 and 111 for the first receiver, respectively 112 and 113 for the second receiver, where they are demodulated by the intermediate frequency $F'_I$ for the mixers 110 and 113 and by the $\pi/2$-phase shifted intermediate frequency $F'_I$ for mixers 111 and 112.

The signals delivered by the mixers 110 and 111, 112 and 113 respectively, are quadrature components of the video signal.

Each component of the video signal, sampled at a frequency $f_E$ by means of the switches 114 and coded (the coding circuit is not represented), is then applied to the input of a digital filter bank 115, 116 respectively.

The measurement circuit 120, respectively 121, the input of which is connected to the output of the filter bank 115, respectively 116, indicates the power $P_1(k)$, respectively $P_2(k)$, of the useful signal in the final filter of the radar.

A circuit 118, fed by the values $P_1(k)$ and $P_2(k)$ supplied by the circuits 120 and 121, computes the measured value y(k) of the ambiguous range given by the following relationship:

$$y(k) = \frac{P_2(k) - P_1(k)}{P_2(k) + P_1(k)}$$

The output of the Doppler filter of bank 115 and that of the Doppler filter of bank 116, which correspond to the sighted target, are applied to the input of the circuit 119 making the vectorial sum of the two input signals. The calculated vectorial sum is applied to the input of circuit 117, that makes it possible to get the Doppler frequency $f_d$, used for servoing the local oscillator 105, and consequently the radial velocity VR of the target relative to the radar, as well as the total power $P(k)=P_1(k)+P_2(k)$ of the useful signal, which data being used by the Kalman filter 1 in FIG. 1.

FIG. 3 represents in detail the servoloop controlling the repetition frequency $f_R(k)$ in such a way that on the one hand the ambiguity number remains constant for enabling the radar-to-target range to be estimated from the measurements y(k) of the ambiquous range and on the other hand the eclipsing losses are minimized.

As represented on FIG. 3 the servo-loop for controlling the repetition frequency $f_R(k)$ i.e. the maximum ambiguity range ad(k) which is connected with the repetition frequency $f_R(k)$ by a constant factor, is of the first order.

From the above-mentioned relationship (III):

$$d(k)=[n(k)ad(k)+da(k)] \quad \text{(III)}$$

On steady state, at time $T_k$, the ambiguous range should be equal to 0.5 ad(k) so as to cancel the eclipsing process.

$$d(k)=[n(k)+0.5]ad(k)$$

At time $T_{k+1}$ $$d(k+1)=d(k)-dd(k)=[n(k+1)+0.5]ad(k+1)$$

Consequently, as $n(k+1)=n(k)=n$ (X)

$$ad(k+1) = ad(k) - \frac{dd(k)}{n+0.5}$$

A gain G is needed for ensuring the stability of the loop in the presence of noise:

$$ad(k+1) = ad(k) + \frac{Gy(k) - dd(k)}{n+0.5}$$

for a transfer function of the first order. Only an estimation ñ(k) of the ambiguity number n is avalaible. Furthermore, making the ambiguous range tend to 0.5 ad(k) so as to reach the steady state comes to recentering the input information of the servo-loop on 0.5 ad(k) and thus to taking y(k)−0.5 ad(k) instead of y(k) as input information of the servo-loop.

Finally, a suitable servo-loop of the first order is shown by FIG. 3 which receives at its input the information y(k)−0.5 ad(k) and delivers the information ad(k+1) i.e by multiplying by (2/c) the inverse of the repetition frequency $f_R(k+1)$ to be used for the following measurement cycle. This servo-loop satisfies the following relationship (XV bis)

$$ad(k+1) = c/2f_R(k+1) =$$

$$ad(k) + \frac{G[y(k) - 0.5\ ad(k)] - dd(k)}{n(k) + 0.5}$$

where ad(k)=c/2f$_R$(k) and dd(k)=V$_R$(k).Δt.

In FIG. 3, ad(k) is the output value at a time prior to $T_k$; it is represented by the output itself which is delayed by a circuit 38 corresponding to the transfer function $z^{-1}$.

The circuit 2 of FIG. 1 supplies the measurement y(k) of the ambiguous range to circuit 3.

The maximum ambiguous range value ad(k) corresponding to the repetition frequency $f_R(k)$ at time $T_k$ is applied to a circuit 39 dividing by two which supplies a signal 0.5 ad(k) to a subtraction circuit 31 for recentering the ambiguous range; the signal 0.5 ad(k) is subtracted in the circuit 31 from the measured value y(k) supplied by the circuit 2. This circuit 31 delivers an output signal y(k)−0.5 ad(k) which is amplified by circuit 32 with a gain G and then applied to the input of addition/subtraction circuit 33 where it is reduced by the distance dd(k) covered by the target relative to the radar during the time interval Δt of $T_k$ to $T_{k+1}$. This value corresponding to a velocity anticipation is supplied by the radar 2 itself (of FIG. 1) in the form of the radial velocity $V_R(k)$ of the target relative to the radar, said velocity being also the range variation during the time unit. Circuit 34 supplies this compensating term dd(k) by multiplying by the time interval Δt=$T_{k+1}-T_k$ the radial velocity $V_R(k)$ supplied by radar 2.

The output signal of circuit 33 is therefore equal to:

$$G[y(k)-0.5\ ad(k)]-dd(k)$$

It is applied to the input of the circuit 35 where it is multiplied by a gain 1/[ñ(k)+0.5] calculated and supplied by a circuit 36 from the value n(k) of the ambiguity number estimated and delivered by the circuit 1 of FIG. 1.

The output of the multiplying circuit 35 is then applied to the input of an adding circuit 37 which also receives the value ad(k) of the maximum ambiguous range at time $T_k$ supplied by its output through the delay circuit 38 having the transfer function $z^{-1}$. This adding circuit 37 supplies the value ad(k+1) corresponding to the maximum ambiguous range at time $T_{k+1}$. The inverse of the obtained maximum ambiguous range multiplied by c/2 is equal to the new value of the reptition frequency $f_R(k+1)$ at time $T_{k+1}$:

$$f_R(k+1)=c/2ad(k+1)$$

where c is the speed of light.

The new value $f_R(k+1)$ of the repetition frequency for the following measurement cycle is computed by the circuit 40 connected to the output of the adding circuit 37, and applied to the circuits 102 and 107 of FIG. 2 controlling the switches 1021, 1022 and 1071, 1072 respectively.

There has thus been achieved a device for removing range ambiguity in a high repetition frequency pulse Doppler radar by an adequate control of the repetition frequency which makes it possible to maintain the ambiguity number constant and to minimize eclipsing losses.

In the previous description of the servo-loop the frequency $f_R(k)$ was assumed to be selected arbitrarily in a wide band. If only a few discrete values can be selected the results are only a little bit worse provided that the selected discrete values of the repetition frequency are not spread too much.

When the radar-to-target range d(k) tends to decrease the value of the repetition frequency may increase indefinitely as the loop ensures the constancy of the ambiguity number n. However in practice as already mentioned before the repetition frequency reaches too high values, the range estimator 1 (FIG. 1) has become sufficiently good for making it possible to know by how many units the ambiguity number n has varied, if a lower repetition frequency $f_R(k)$ is chosen. This variation has to be taken into account in the state equation.

Finally, it is worth noting that we have not used the fact that the ambiguity number is an integer. When the error in the estimation of n(k), i.e. in λ22(k), is small enough for n to be known with certainty, if n is considered as an integer, the error in range approaches the error in the ambiguous range which is very low thanks to the filtering by the tracking loop in the radar.

This invention can be applied for example in missile guidance to the computation of firing ranges, to the arming of proximity fuzes, to the measurement of a target span, that is to say to any field which requires an accurate knowledge of the radar-to-target range.

What is claimed is:

1. A device for removing range ambiguity in a pulse Doppler radar having a high repetition frequency $f_R(k)$ which varies at times $T_k = k\Delta t$, where $\Delta t$ is the duration of a measurement cycle, operating in the tracking mode, and including a measurement circuit which supplies the measured ambiguous range corresponding to the repetition frequency $f_R(k)$ and an estimation circuit which supplies an estimation of the ambiguity number and of the radar-to-target range as well as the standard deviation of the error in the estimated range corresponding to the repetition frequency $f_R(k)$, device wherein the repetition frequency is controlled by a servo-loop which, from the measured ambiguous range and from the estimated ambiguity number at the repetition frequency $f_R(k)$ calculates the repetition frequency $f_R(k+1)$ to be used for the following measurement cycle, such that the ambiguity number at $f_R(k+1)$ remains constant, the servo-loop having a transfer function which is of the first order and being composed of the following circuits connected in series:

a first subtraction circuit in which the quantity c/4 $f_R(k)$, is subtracted from the measured ambiguous range supplied by the radar, c being the velocity of the light;

an amplifier having a gain G;

a second substration circuit in which the output signal of the amplifier is reduced by the variation of the radar-to-target range during the time lapse $\Delta t$, said variation being calculated by a first circuit which multiplies by the duration $\Delta t$ the radial velocity of the target relative to the radar as supplied by the pulse Doppler tracking radar;

a second circuit multiplying the output signal of the second subtraction circuit by a coefficient 1/[n̂(k)+0.5] calculated by a first calculating circuit supplied with the estimated ambiguity number n̂(k) corresponding to the repetition frequency $f_R(k)$;

an adding circuit the first input of which receives the output signal of the second multiplying circuit and which delivers a signal equal to c/2 $f_R(k+1)$ and applied to its second input through a delay circuit having a transfer function $z^{-1}$;

a second calculating circuit supplied with the output signal c/2 $f_R(k+1)$ of the adding circuit and delivering the repetition frequency $f_R(k+1)$ which is supplied to the pulse Doppler radar for the following measurement cycle.

2. A device according to claim 1, wherein the estimation circuit is a Kalman filter supplied with radar information including the radial velocity of the target relative to the radar and the power of the useful signal at the pulse repetition frequency $f_R(k)$ as well as the pulse repetition frequency $f_R(k)$ itself.

* * * * *